United States Patent
Liu (10) Patent No.: US 9,135,590 B1
(45) Date of Patent: Sep. 15, 2015

(54) SYSTEMS, METHODS AND COMPUTER PROGRAM PRODUCTS FOR ANALYZING AGILE SCRUM TEAM EFFICIENCY

(71) Applicant: CA, Inc., Islandia, NY (US)

(72) Inventor: Kevin Liu, Beijing (CN)

(73) Assignee: CA, Inc., New York, NY (US)

( * ) Notice: Subject to any disclaimer, the term of this patent is extended or adjusted under 35 U.S.C. 154(b) by 287 days.

(21) Appl. No.: 13/799,940

(22) Filed: Mar. 13, 2013

(51) Int. Cl.
*G06F 9/44* (2006.01)
*G06Q 10/06* (2012.01)

(52) U.S. Cl.
CPC ........ *G06Q 10/06* (2013.01); *G06F 8/20* (2013.01); *G06F 8/70* (2013.01)

(58) Field of Classification Search
CPC ......... G06F 8/20; G06F 8/70; G06F 11/3676; G06F 21/57
See application file for complete search history.

(56) References Cited

U.S. PATENT DOCUMENTS

| | | | |
|---|---|---|---|
| 8,387,026 B1* | 2/2013 | Hundt et al. .................. | 717/140 |
| 8,701,078 B1* | 4/2014 | Holler et al. .................. | 717/101 |
| 2005/0114830 A1* | 5/2005 | Knutson et al. ............... | 717/102 |
| 2008/0046259 A1* | 2/2008 | Johnston ........................ | 705/1 |
| 2008/0313598 A1* | 12/2008 | Frasher et al. ................ | 717/101 |
| 2010/0115523 A1* | 5/2010 | Kuschel ......................... | 718/103 |
| 2010/0299650 A1* | 11/2010 | Abrahamsen et al. ........ | 717/102 |
| 2011/0302090 A1* | 12/2011 | Newpol et al. ................ | 705/301 |

OTHER PUBLICATIONS

Tomohiro Hayata et al.; A Hybrid Model for IT Project with Scrum; 2011 IEEE; pp. 285-290; <http://ieeexplore.ieee.org/stamp/stamp.jsp?tp=&arnumber=5986572>.*

Md. Junaid Arafeen et al.; Improving Software Development Using Scrum Model by Analyzing Up and Down Movements on The Sprint Burn Down Chart Proposition for Better Alternatives; 2009 JDCTA; pp. 109-115; <http://www.aicit.org/jdcta/ppl/14.pdf>.*

Kevin Vlaanderen et al.; The agile requirements refinery: Applying SCRUM principles to software product management; 2011 Elsevier; pp. 58-70; <http://www.sciencedirect.com/science/article/pii/S0950584910001539#>.*

Pieter Adriaan Rottier et al.; Agile Development in a Medical Device Company; 2008 Agile conference; pp. 218-223; <http://ieeexplore.ieee.org/stamp/stamp.jsp?tp=&arnumber=4599480>.*

Erik Bos et al.; An Agile CMM; 2004 Springer; pp. 129-138; <http://link.springer.com/chapter/10.1007/978-3-540-27777-4_13>.*

Weam M. Farid et al.; Visualization and Scheduling of Non-functional Requirements for Agile Processes; 2013 IEEE; 8 pages; <http://ieeexplore.ieee.org/stamp/stamp.jsp?tp=&arnumber=6567413>.*

* cited by examiner

*Primary Examiner* — Thuy Dao
*Assistant Examiner* — Cuong V Luu
(74) *Attorney, Agent, or Firm* — Myers Bigel Sibley & Sajovec, P.A.

(57) ABSTRACT

A completion time is obtained for each phase of a plurality of phases in a user story. Completion times of phases are obtained for each user story of a plurality of user stories. A maximum completion time, a minimum completion time and a composite metric are determined for phases common among the user stories. A chart displays the phases common among the user stories over the sprint time period. Sprint time period is used to define a first axis and phase completion time is used to define a second axis. A vertical bar is displayed for each respective phase, parallel with the second axis, having a top end on the second axis based on a maximum completion time for the respective phase and a bottom end on the second axis based on a minimum completion time.

14 Claims, 6 Drawing Sheets

FIGURE 1

Prior Art

SYSTEMS, METHODS AND COMPUTER PROGRAM PRODUCTS FOR ANALYZING AGILE SCRUM TEAM EFFICIENCY

TECHNICAL FIELD

The present disclosure relates generally to computer networks, software applications and team management.

BACKGROUND

Agile software development involves adaptive and iterative methods for collaborating and developing software. Scrum is an agile software development framework for managing software projects. In many cases, when a development team starts to use the scrum development process to plan and complete an action, or user story, it may find that the team is not as productive as it should be. However, without certain statistical data to support the analysis, it is difficult to locate the source of the problem.

BRIEF SUMMARY

According to an embodiment of the disclosure, a completion time is obtained for each phase of a plurality of phases in a user story. A phase may indicate a phase or specified portion of a user story completed by team members during a sprint time period. A completed phase may include completion of a phase, completion of work on a phase, or an assigned phase. Sprint time period may be an agile scrum sprint time period. Sprint time period may also include any other time period set for completing or completing work on the user story action or phases of a user story. Completion times of phases are obtained for each user story of a plurality of user stories. A completion time may be duration of time taken by one or more team members to complete or complete work on a phase. A maximum completion time, a minimum completion time and a composite metric are determined for phases common among the user stories. The composite metric may be an average completion time of a phase or any other metric based on the maximum and minimum completion times. A chart displays phases common among the user stories over a time period, such as the sprint time period. Sprint time period may be used to define a first axis and phase completion time may be used to define a second axis.

A bar is displayed in the chart for each respective phase in the plurality of phases, parallel with the second axis, having a first end (e.g., top end) on the second axis based on a maximum completion time for the respective phase and a second end (e.g., bottom end) on the second axis based on a minimum completion time for the respective phase. The bar may be a vertical bar perpendicular to the second, or sprint time period axis. The bar may also be oriented in another fashion so long as the bar is substantially perpendicular to a sprint time period axis or an equivalent overall time period axis. The length of the bar is based on the difference between the maximum completion time and the minimum completion time. The bar is on the first axis according to a completion time of the respective phase.

According to a further embodiment of the disclosure, a first portion of the bar is displayed differently than a second portion of the bar, wherein the first portion extends from the first end to a middle part of the bar and the second portion extends from the middle part to the second end. The middle part is on the second axis based on a composite metric for the respective phase.

According to another embodiment of the disclosure, a representation of a gap time period is displayed between an earlier bar and a latter bar in the chart. The gap time period is based on the composite metric of the latter bar.

According to an embodiment of the disclosure, each bar may be categorized as weak, average or strong based on the minimum completion time, maximum completion time and/or the composite metric and on the second axis based on the categorizing.

According to another embodiment of the disclosure, another chart of a selected user story may be displayed. The sprint time period may define a first axis of the user story chart. Labels for the plurality of phases for the selected user story may define a second axis. A shape for each respective day of team member activity for each respective phase in the plurality of phases of the selected user story may be displayed. Each shape may be placed according to a corresponding day on the first axis and corresponding to a label on the second axis that is associated with the respective phase. A number may be displayed in each shape indicating a time duration or period of activity for the respective phase on the respective day. A number indicating actual time and a number indicating estimated time may also be displayed for each respective phase.

Some other embodiments are directed to related methods, systems and computer program products.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Embodiments of the present disclosure are illustrated by way of example and are not limited by the accompanying figures with like references indicating like elements.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Figure 1:
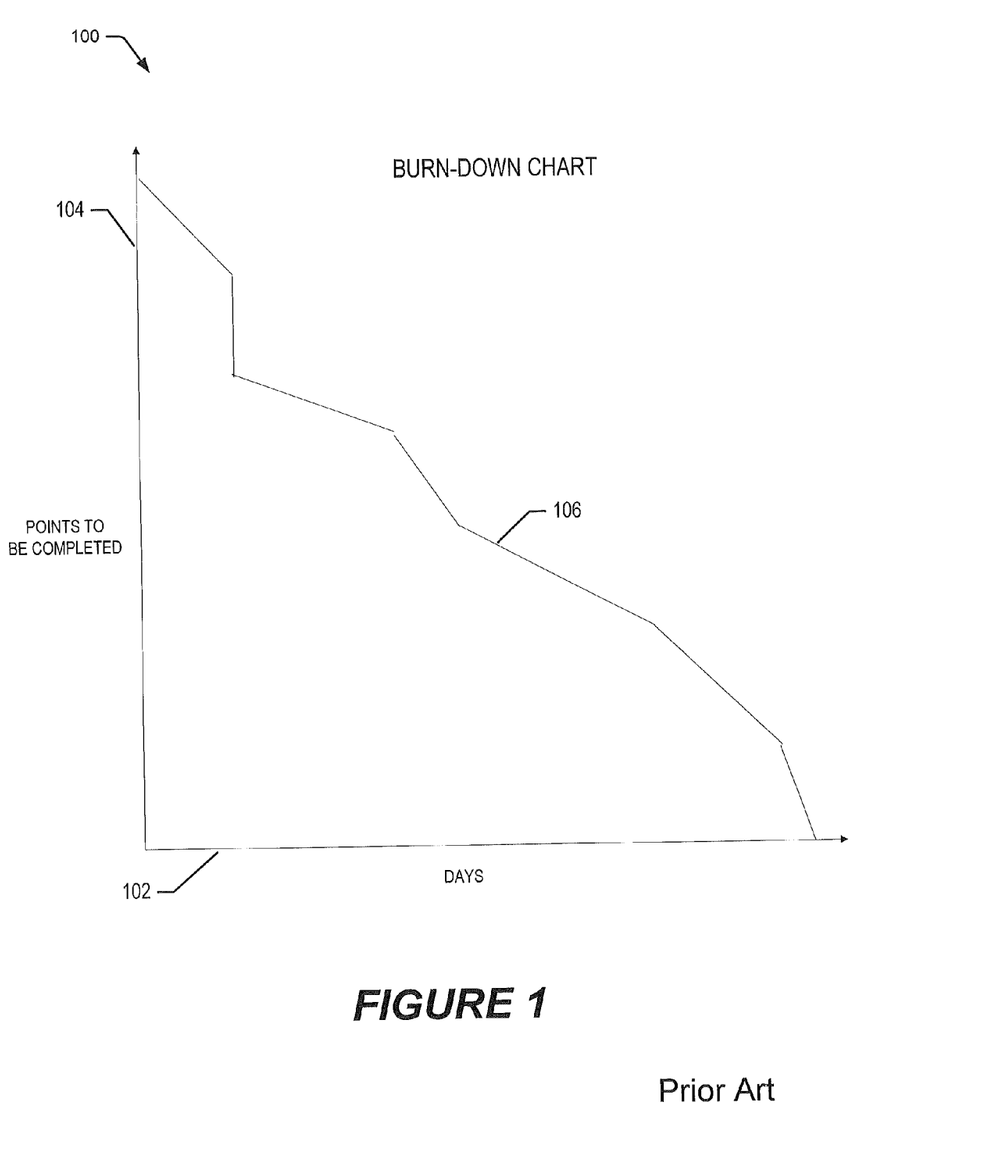
FIG. 1 is a graph illustrating an existing chart for completion of a user story.

Using agile scrum for software development can be effective. However, existing systems for analyzing team performance fall short when it comes to providing certain statistical data in a convenient manner for scrum masters or product owners. Some scrum charts show how much work, or how many man hours or points of work, remain over a sprint period. A sprint period is a specified period of time to complete one or more tasks or phases. In an example, FIG. 1 shows a simple chart 100 representing a burn-down chart in agile scrum. A first axis 102 marks the days of the sprint period. The second axis 104 indicates the points left to complete the task. As points are taken to complete the tasks, graph line 106 drops until all the points have been exhausted. However, this chart is not very informative as to why certain items take longer than necessary.

Other scrum analysis charts may show some type of data, such as completion of a single user story. A user story may be an action taken by the team to add or modify a feature or some functionality of a software program. For example, a user story may be adding a login page or adding a search by username feature to a webpage or software application. These examples of user stories are not meant to be limiting. However, this illustrates only one user story at a time for a development team. Also, such a chart shows very little data for each phase of the user story. It is hard to determine team performance over multiple user stories to address systematic inefficiencies in the actions of the team. Such inefficiencies may be caused by problems in a certain phase or problems in collaboration.

According to various embodiments described herein, automatically collecting data and showing the results in a more telling and user-friendly chart can better expose potential areas for team improvement. The display of specially designed charts can support any improvement decisions for a scrum team.

Figure 2:
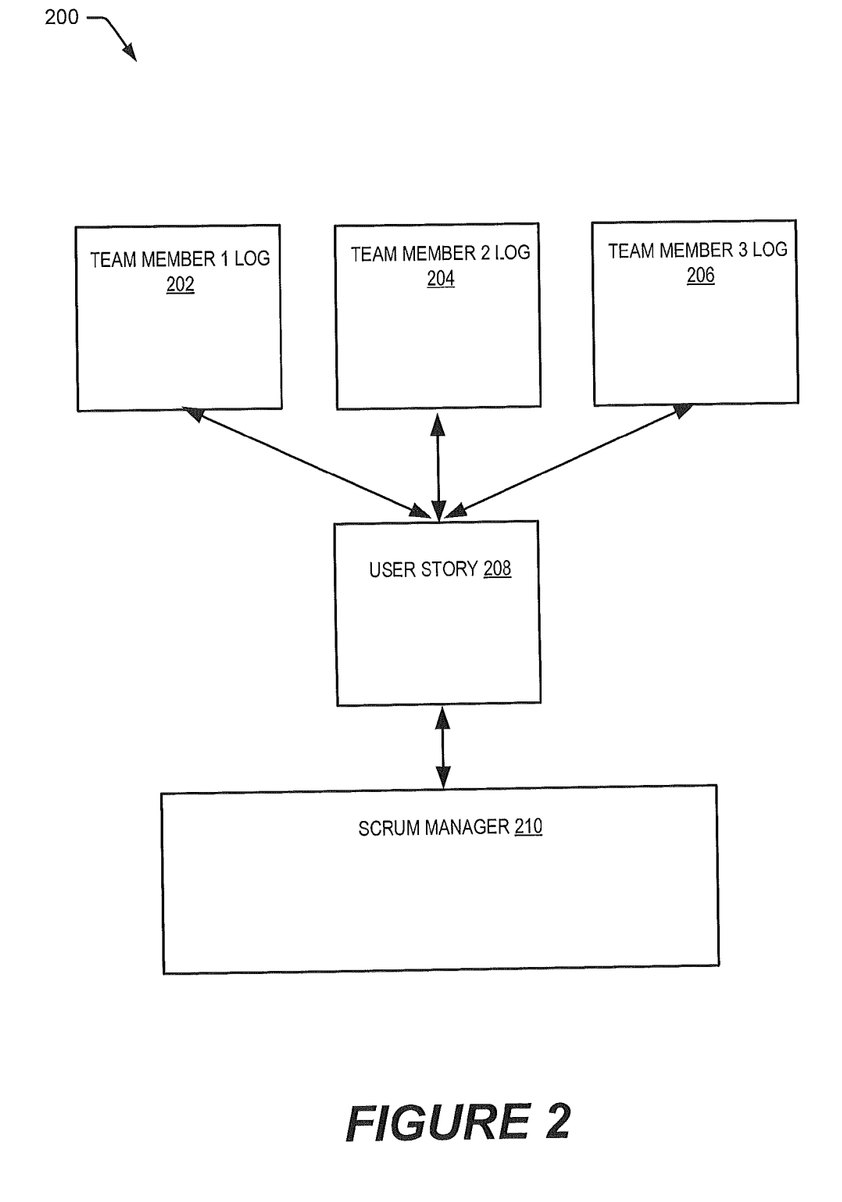
FIG. 2 is a block diagram illustrating a conceptual view of a system for analyzing development team performance, according to various embodiments described herein.

FIG. 2 illustrates system 200 for collecting and analyzing development team scrum performance, according to various embodiments. Team member logs 202-206 may represent data collected about the activity of each team member, including time spent on each phase of multiple user stories. The information may be specific to days, hours, minutes, seconds and/or any other measure of time. The information may label or categorize a team member's activity. The information may be recorded automatically based on checkpoints or use of software applications by the team members. The team members or a team manager may also explicitly record the information.

This activity information may be obtained using computing devices coupled directly or indirectly over a network. The network facilitates wireless or wired communication between computing devices, and may communicate using, for example, IP packets, Frame Relay frames, Asynchronous Transfer Mode (ATM) cells, voice, video, data, and other suitable information between network addresses. The network may include one or more local area networks (LANs), radio access networks (RANs), metropolitan area networks (MANS), wide area networks (WANs), virtual private networks (VPNs), a portion of the global computer network known as the Internet, and/or any other communication system or systems at one or more locations.

Information from team member logs 202-206 may be compiled into one or more user stories 208. Team member activity may be compiled based on individual efforts to complete each phase of a certain user story. Team member activity may also be compiled based on the collective effort of the team to complete each phase of a specific user story.

Scrum manager 210 may obtain and analyze the user story information. Scrum manager 210 may also generate and display multiple charts to better illustrate team performance. Scrum manager 210 may perform, or may include instructions to perform, other operations such as those shown in flowchart 300 of FIG. 3.

Figure 3:
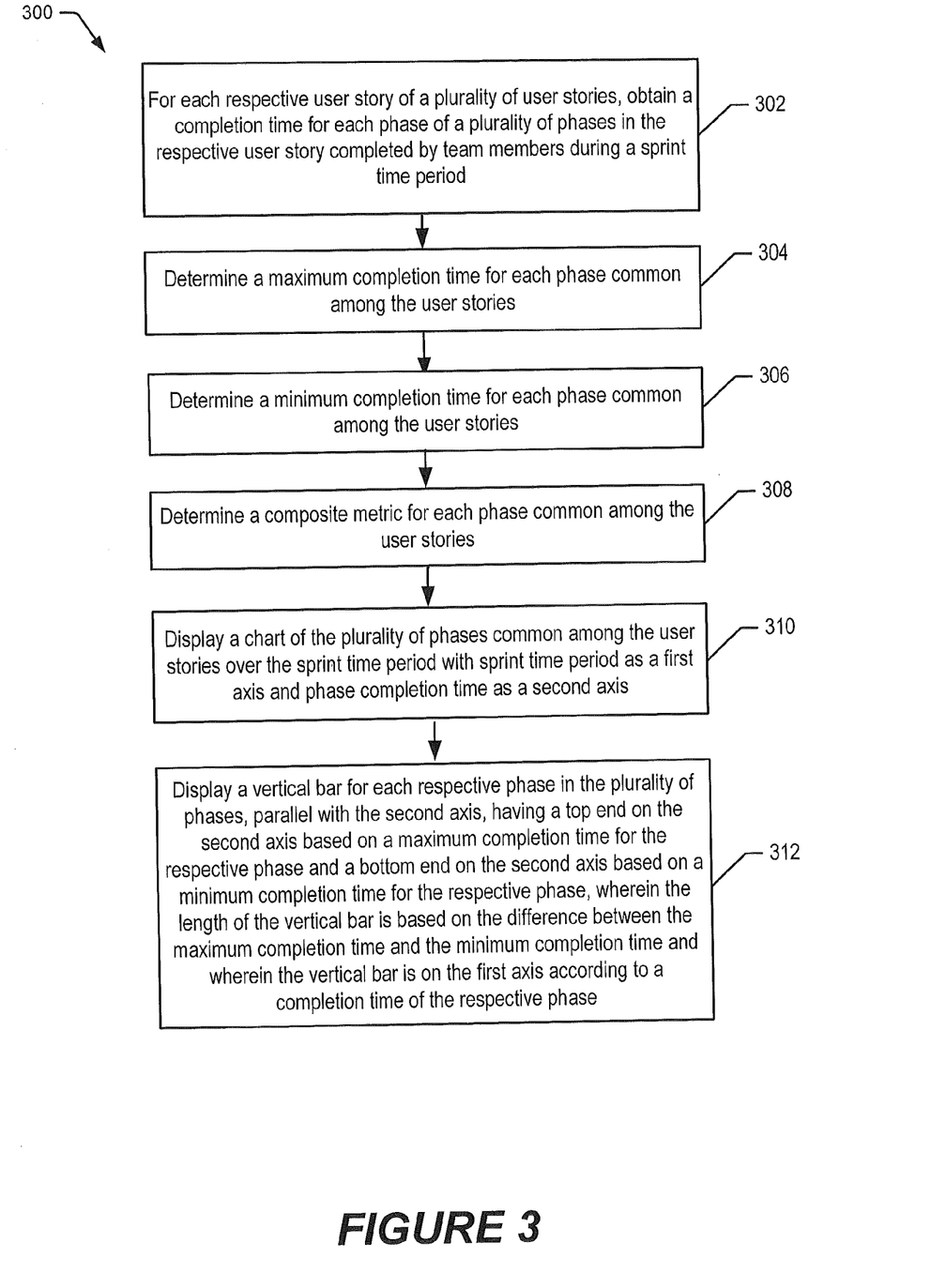
FIG. 3 is a flow chart illustrating a process for analyzing development team performance, according to various embodiments described herein.

Flowchart 300 illustrates operations corresponding to a process for analyzing user story information and displaying a chart, according to some embodiments. In block 302, a completion time is obtained for each phase of a plurality of phases in a user story. A plurality of user stories may include two or more user stories. In some cases, a plurality of user stories may include four or more user stories. This may be performed for each user story of a plurality of user stories. Scrum manager 210 may obtain activity information and other related information from digital records, team member entries or logs, tracking tools, management tools, source code versioning systems, computing devices, data structures and/or any other sources directly or indirectly over a network.

At block 304, a maximum completion time is determined for phases of the plurality of phases common among the plurality of user stories. This may include some of the phases or each phase of the plurality of phases. The rest of this example considers each phase, but is not limited to determining information for each phase. There may be multiple user phases that have common phases, such as coding, testing and bug fixing. Information for the team members may be analyzed for the same phases across multiple user stories. A maximum completion time for a phase may be recorded. At block 306, a minimum completion time is determined for each phase of the plurality of phases common among the plurality of user stories. This may be the least amount of time a team had taken to complete a phase and transition to the next phase.

At block 308, a composite metric is determined for each phase of the plurality of phases common among the plurality of user stories. The composite metric may be an average completion time of a phase. Other metrics may be used, such as a median amount of time or a mode amount of time.

At block 310, a chart of the plurality of phases common among the user stories is displayed. The chart may be displayed with a sprint time period as a first axis. This may include measurements in days, up to perhaps 20 days, as shown by axis 402 in Chart 400 of FIG. 4, according to an embodiment. Time periods other than the determined sprint period may be used. Phase completion time may define a second axis 404. Phase completion time is how many days, or other units of time, take place to complete the phase and/or transition to the next phase.

At block 312, a bar, vertical in this example, is displayed for each respective phase in the plurality of phases, parallel with the second axis, having a first end, top end in this example, on the second axis based on a maximum completion time for the respective phase and a second end, bottom end in this example, on the second axis based on a minimum completion time for the respective phase. The length of the vertical bar may be based on the difference between the maximum completion time and the minimum completion time. The vertical bar may be on the first axis according to a completion time of the respective phase. Vertical bars may be displayed as illustrated in the example of chart 400 of FIG. 4, according to some embodiments.

Figure 4:
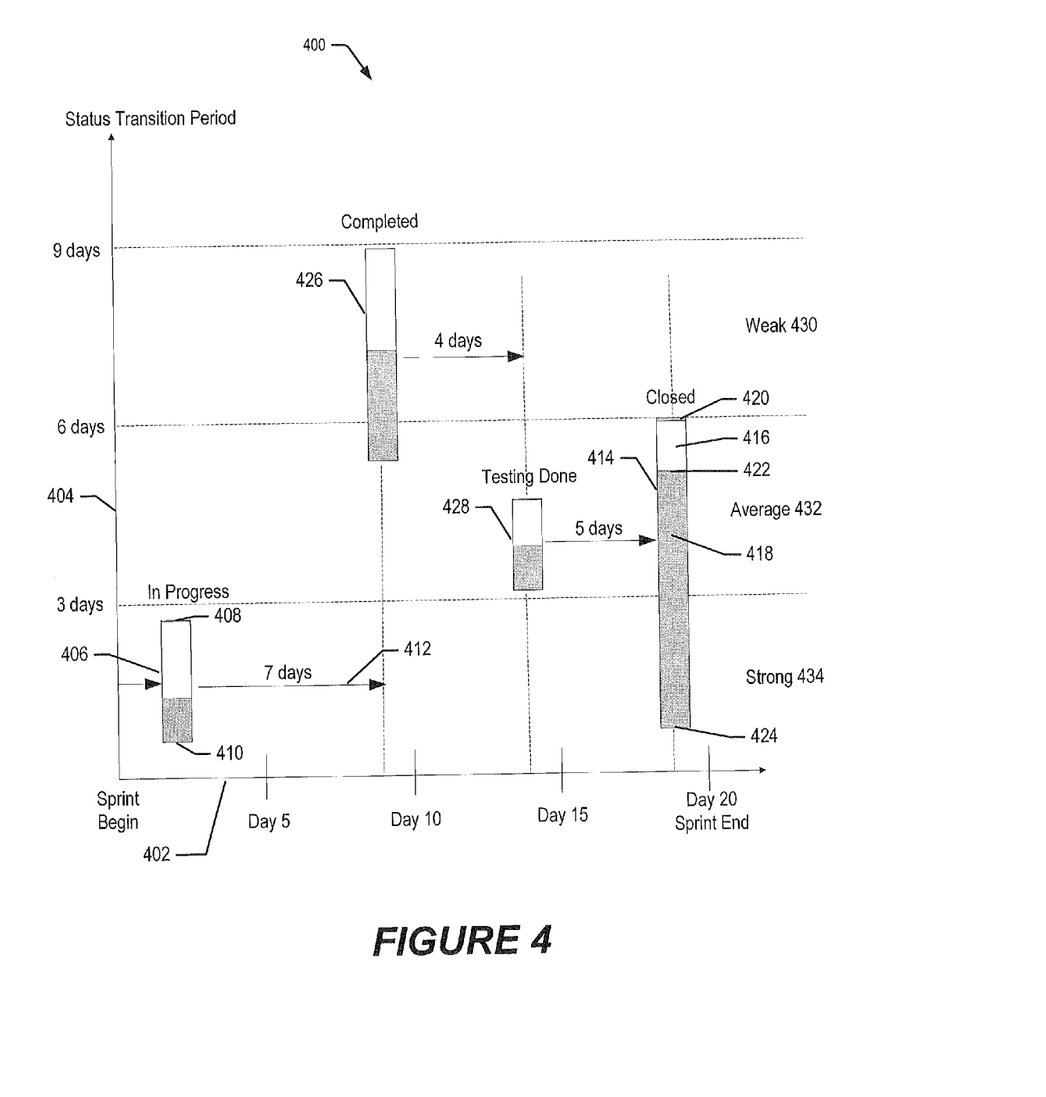
FIG. 4 is a display view illustrating a chart for analyzing development team performance, according to various embodiments described herein.

Chart 400 displays vertical bars of each phase of the user story. The phases in this example include "In Progress", "Completed", "Testing Done" and "Closed". A vertical bar, such as vertical bar 406, is displayed for each respective phase in the plurality of phases. The vertical bars are parallel with second axis 404 and have a top end 408 on the second axis based on a maximum completion time for the respective phase. The vertical bars have a bottom end 410 on the second axis based on a minimum completion time for the respective phase. Bars may be rectangles, ovals or any other shape that is longer in a direction perpendicular to the axis marking the days of the sprint. The length of the vertical bar is based on the difference between the maximum completion time and the minimum completion time. The vertical bar is on first axis 402 according to a completion time of the respective phase. In this example, vertical bar 406 is placed at about Day 2 on first axis 402.

The vertical bars also show additional information. For example, chart 400 shows vertical bar 414. A first portion 416 of the vertical bar is displayed differently than a second portion 418 of the vertical bar. First portion 416 extends from top end 420 to middle part 422 of vertical bar 414 and second portion 418 extends from middle part 422 to bottom end 424. Middle part 422 may be a middle point between top end 420 and bottom end 424, but is not limited to a middle point. In some embodiments, middle part 422 may be any location between top end 420 and bottom end 424. Middle part 422 is on second axis 404 based on a composite metric for the respective phase. The composite metric may be an average completion time for the phase.

In chart 400, first portion 416 is displayed with a lighter color or shade than second portion 418. However, first portion 416 and second portion 418 can be displayed differently in any number of ways. In some cases, first portion 416 and second portion 418 may be displayed in various manners or positions relative to each other.

A representation 412 of a gap time period is displayed between an earlier vertical bar ("In Progress" 408) and a latter vertical bar ("Completed" 426) in the chart. Gap time period 412 of 7 days is based on the composite metric of the latter vertical bar ("Completed" 426). In this case, 7 days is the average completion time of the phase represented by bar 426.

Chart 400 provides for easier analysis in a short period of time. If analyzing chart 400, the minimum time for "Closed" is one day and the maximum time is 6 days. If the average completion time is used for the composite metric, the average is about 5 days. This is easily visible by observing bar 414 with its top end 420 at 6 days, bottom end 424 at one day and middle part 422 between the different colored portions at 5 days. It can be quickly observed that the average completion time is close to the maximum completion time. In some cases, other markings, colorings or shadings can indicate a median, mode or number of times each completion time amount is achieved by the team. In other cases, shading or coloring can be distributed in the portions of the vertical bars in order to indicate other information specific to completion time dates, team members or other factors. This will provide further information for team management that can be informative and observed quickly.

The gap of 5 days between the "Testing Done" bar 428 and "Closed" bar 414 is also visible. These gap indications can be displayed or coded in certain ways as to distinguish weak, average or strong performance. The gap indications can also be displayed as to show a comparison to estimated times.

Each vertical bar may be categorized as weak 430, average 432 or strong 434 based on the maximum completion time and/or the composite metric and on the second axis based on the categorizing. As shown in chart 400, the "Closed" bar 414 is categorized as average or maybe strong.

By contrast, the "Completed" bar 426 has a minimum time of 5 days and a maximum of 9 days. The average is about 7 days, as shown by gap representation 412. This bar is categorized as weak based on the categorization criteria. Such categorization criteria may vary based on the objectives of a user story or definition of phases within the user story. Some phases may be expected to be longer while others may be expected to be shorter. The actual may be compared to the estimated. Nevertheless, based on the categorization and placement of the "Completed" vertical bar 426 in weak section 430, it can be quickly determined that the team needs to improve on this phase or point of the user story.

Figure 5:
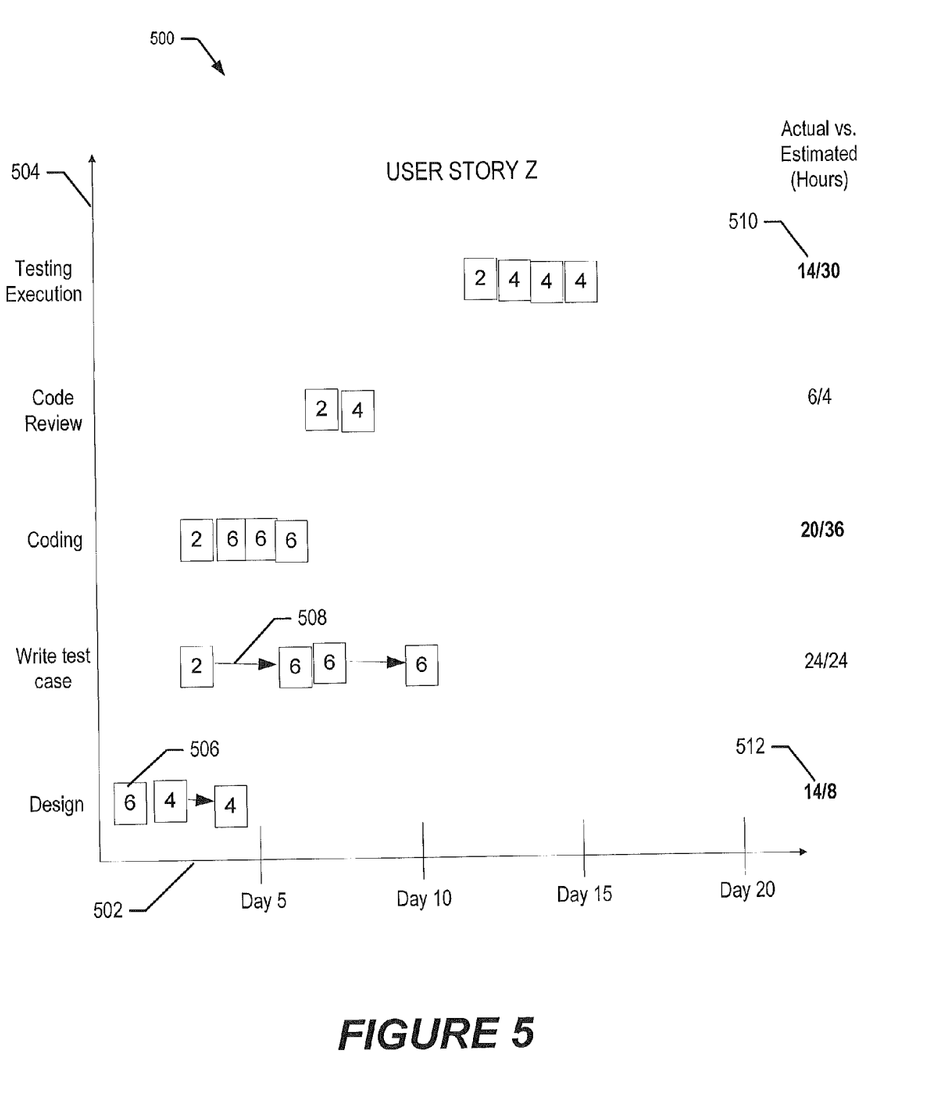
FIG. 5 is a display view illustrating another chart for analyzing development team performance, according to various embodiments described herein.

To further analyze team performance, chart 500 of FIG. 5 may be generated and displayed, according to various embodiments of the disclosure. The sprint time period may be a first axis 502 of the user story chart and labels for the plurality of phases for the selected user story may form a second axis 504. A shape, such as box 506, may be displayed for each respective day of team member activity for each respective phase in the selected user story. Each shape may be placed according to a corresponding day on first axis 502. Box 506 is placed at Day 1. Box 506 may also be placed at a location corresponding to a label on the second axis 504 associated with the respective phase. In this example, box 506 is placed at a position corresponding horizontally to the label "Design".

A number may be displayed in each shape indicating a time of activity for the respective phase on the respective day. Box 506 shows a 6, which can mean that the team members collectively spent 6 hours on this phase on day 1. Further information may be provided by numbers, shapes, shading, coloring and/or other distinctive means.

A number indicating actual time and a number indicating estimated time may also be displayed for each respective phase. Number 512 shows 14 actual hours for "Design" when the estimated time was 8 hours. Design has taken longer than expected and adjustments can be made. Number 510 shows 14 actual hours rather than an estimated 30 hours. Perhaps testing was not as thorough. In some cases, a gap 508 may be shown indicating a period of time without work on the phase task.

If chart 500 were to be analyzed, it could quickly be determined that "Testing Execution" started too late. It has been several days since "Coding" had been completed. Also, due to the gaps, such as gap 508 for "Write test case", test case writing does not seem as productive as it could be.

Charts 400 and 500 illustrate the ease at which a scrum manager can determine inefficiencies. Such charts may also be shown to team members to help explain rationale for scrum decisions. Scrum managers and project owners may benefit from the increased utility of the charts described in the embodiments.

In an embodiment, scrum manager 210 may operate through a browser on a node or computing device. The browser may be any commonly used browser, including any multithreading browser.

As will be appreciated by one skilled in the art, aspects of the disclosure may be embodied as a method, data processing system, and/or computer program product. Furthermore, embodiments may take the form of a computer program product on a tangible computer readable storage medium having computer program code embodied in the medium that can be executed by a computing device.

Figure 6:
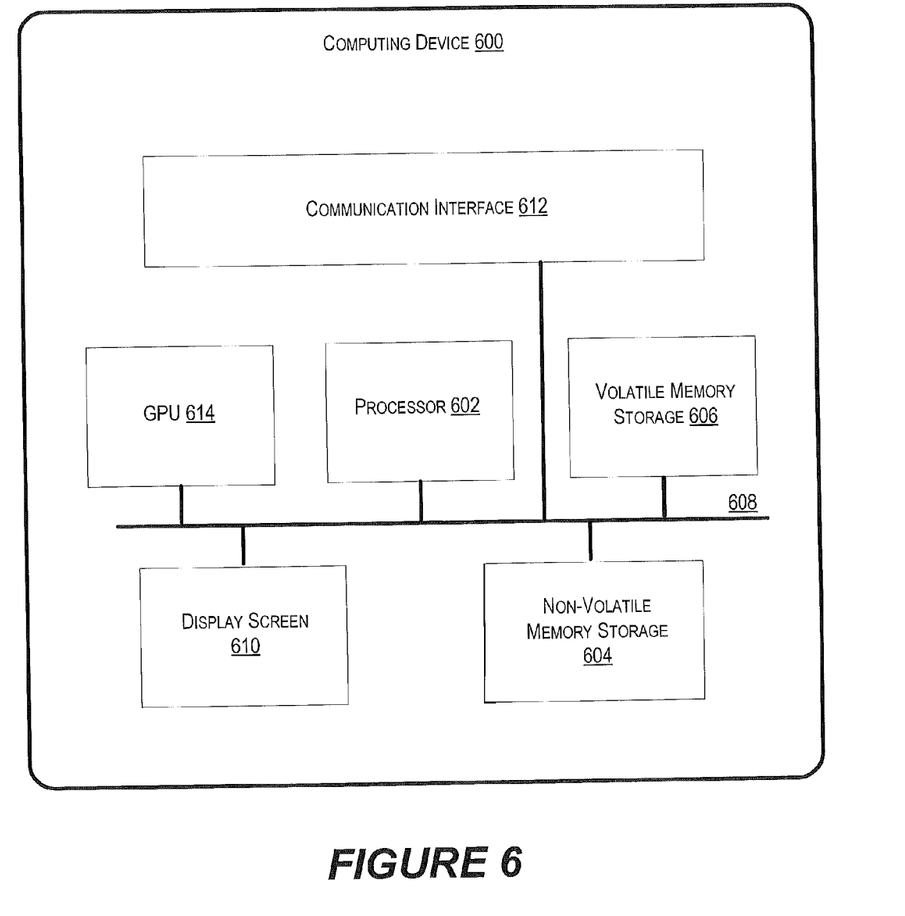
FIG. 6 is a block diagram of a computing device in which embodiments can be implemented.

FIG. 6 is an example computer device 600 in which embodiments of the present disclosure, or portions thereof, may be implemented as computer-readable code. For example, the components of scrum manager 210 or any other components of system 200, display views 400-500 or method 300 may be implemented in one or more computer devices 600 using hardware, software implemented with hardware, firmware, tangible computer-readable storage media having instructions stored thereon, or a combination thereof and may be implemented in one or more computer systems or other processing systems. Computer devices 600 may also be virtualized instances of computers. Components and methods in FIGS. 2-5 may be embodied in any combination of hardware and software.

Computing device 600 may include one or more processors 602, one or more non-volatile storage mediums 604, one or more memory devices 606, a communication infrastructure 608, a display screen 610 and a communication interface 612. Computing device 600 may also have networking or communication controllers, input devices (keyboard, a mouse, touch screen, etc.) and output devices (printer or display).

Processor(s) 602 are configured to execute computer program code from memory devices 604 or 606 to perform at least some of the operations and methods described herein, and may be any conventional or special purpose processor, including, but not limited to, digital signal processor (DSP), field programmable gate array (FPGA), application specific integrated circuit (ASIC), and multi-core processors.

GPU 614 is a specialized processor that executes instructions and programs, selected for complex graphics and mathematical operations, in parallel.

Non-volatile memory storage 604 may include one or more of a hard disk drive, flash memory, and like devices that may store computer program instructions and data on computer-readable media. One or more of non-volatile memory storage 604 may be a removable storage device.

Volatile memory storage 606 may include one or more volatile memory devices such as but not limited to, random access memory. Communication infrastructure 608 may include one or more device interconnection buses such as Ethernet, Peripheral Component Interconnect (PCI), and the like.

Typically, computer instructions are executed using one or more processors 602 and can be stored in non-volatile memory storage 604 or volatile memory storage 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Aspects of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described embodiments or any actual software code with the specialized control of hardware to implement such embodiments, but should be defined only in accordance with the following claims and their equivalents.

What is claimed is:

1. A computer-implemented method, comprising:
   determining a maximum completion time for ones of a plurality of phases common among a plurality of user stories;
   determining a minimum completion time for ones of the plurality of phases common among the plurality of user stories;
   determining a composite metric based on the maximum completion time and the minimum completion time for ones of the plurality of phases common among the plurality of user stories;
   displaying a chart, utilizing a display device, of the plurality of phases common among the plurality of user stories over a sprint time period with the sprint time period as a first axis and phase completion time as a second axis;
   displaying a bar for ones of the plurality of phases in the chart, parallel with the second axis, the bar having a first end displayed at a location relative to the second axis based on a maximum completion time for a respective phase and a second end displayed at another location relative to the second axis based on a minimum completion time for the respective phase, wherein the length of the bar is based on the difference between the maximum completion time and the minimum completion time and wherein the bar is on the first axis according to a completion time of the respective phase;
   displaying a first portion of the bar differently than a second portion of the bar, wherein the first portion extends from the first end to an intermediate part of the bar and the second portion extends from the intermediate part to the second end, wherein the intermediate part is displayed relative to the second axis based on the composite metric for the respective phase; and
   displaying a representation of a gap time period between an earlier bar and a latter bar in the chart, wherein the gap time period is based on the composite metric of the earlier bar.

2. The method of claim 1, wherein determining a composite metric further comprises:
   determining an average completion time for ones of the plurality of phases common among the plurality of user stories.

3. The method of claim 1, wherein displaying the chart further comprises:
   categorizing each bar of the chart as one of weak, average or strong based on the maximum completion time and the composite metric; and
   placing each bar of the chart at a location relative to the second axis based on the categorizing.

4. The method of claim 1, further comprising:
displaying a user story chart for a selected user story of the plurality of user stories with the sprint time period as a first axis of the user story chart and labels for the plurality of phases for the selected user story as a second axis; and
displaying a shape for each respective day of team member activity for each respective phase in the plurality of phases of the selected user story, wherein each shape is placed according to a corresponding day on the first axis and corresponding to a label on the second axis associated with the respective phase.

5. The method of claim 4, further comprising:
displaying a number in each shape indicating a time of activity for the respective phase on the respective day; and
displaying a number indicating actual time and a number indicating estimated time for each respective phase.

6. A system, comprising:
a processor; and
a memory coupled to the processor and comprising computer readable program code embodied in the memory that when executed by the processor causes the processor to perform operations comprising:
for each respective user story of a plurality of user stories, obtaining a completion time for each phase of a plurality of phases in the respective user story completed by one or more team members during a sprint time period;
determining a maximum completion time for ones of the plurality of phases common among the plurality of user stories;
determining a minimum completion time for ones of the plurality of phases common among the plurality of user stories;
determining a composite metric based on the maximum completion time and the minimum completion time for ones of the plurality of phases common among the plurality of user stories;
displaying a chart of the plurality of phases common among the plurality of user stories over the sprint time period with sprint time period as a first axis and phase completion time as a second axis;
displaying a vertical bar for ones of the plurality of phases in the chart, parallel with the second axis, the vertical bar having a top end displayed at a location relative to the second axis based on a maximum completion time for a respective phase and a bottom end displayed at another location relative to the second axis based on a minimum completion time for the respective phase, wherein the length of the vertical bar is based on the difference between the maximum completion time and the minimum completion time and wherein the vertical bar is on the first axis according to a completion time of the respective phase;
displaying a first portion of the vertical bar differently than a second portion of the vertical bar, wherein the first portion extends from the to end to an intermediate part of the vertical bar and the second portion extends from the intermediate part to the bottom end, wherein the intermediate part is displayed relative to the second axis based on the composite metric for the respective phase; and
displaying a representation of a gap time period between an earlier vertical bar and a latter vertical bar in the chart, wherein the gap time period is based on the composite metric of the earlier vertical bar.

7. The system of claim 6, the operations further comprising:
determining an average completion time for ones of the plurality of phases common among the plurality of user stories.

8. The system of claim 6, the operations further comprising:
categorizing each vertical bar of the chart as one of weak, average or strong based on the maximum completion time and the composite metric; and
placing each vertical bar of the chart at a location relative to the second axis based on the categorizing.

9. The system of claim 6, the operations further comprising:
displaying a user story chart for a selected user story of the plurality of user stories with the sprint time period as a first axis of the user story chart and labels for the plurality of phases for the selected user story as a second axis;
displaying a shape for each respective day of team member activity for each respective phase in the plurality of phases of the selected user story, wherein each shape is placed according to a corresponding day on the first axis and corresponding to a label on the second axis associated with the respective phase;
displaying a number in each shape indicating a time of activity for the respective phase on the respective day; and
displaying a number indicating actual time and a number indicating estimated time for each respective phase.

10. A computer program product, comprising:
a tangible non-transitory computer readable storage medium having computer readable program code embodied in the medium that when executed by a processor causes the processor to perform operations comprising:
for each respective user story of a plurality of user stories, obtaining a completion time for each phase of a plurality of phases in the respective user story completed by one or more team members during a sprint time period;
determining a maximum completion time for ones of the plurality of phases common among the plurality of user stories;
determining a minimum completion time for ones of the plurality of phases common among the plurality of user stories;
determining a composite metric based on the maximum completion time and the minimum completion time for ones of the plurality of phases common among the plurality of user stories;
displaying a chart of the plurality of phases common among the plurality of user stories over the sprint time period with sprint time period as a first axis and phase completion time as a second axis;
displaying a bar for ones of the plurality of phases in the chart, parallel with the second axis, the bar having a first end on the second axis based on a maximum completion time for a respective phase and a second end on the second axis based on a minimum completion time for the respective phase, wherein the length of the bar is based on the difference between the maximum completion time and the minimum completion time and wherein the bar is on the first axis according to a completion time of the respective phase;
displaying a first portion of the bar differently than a second portion of the bar, wherein the first portion extends from the first end to an intermediate part of the bar and the second portion extends from the intermediate part to the second end, wherein the intermediate part is displayed relative to the second axis based on the composite metric for the respective phase; and displaying a representation of a gap time period between an earlier bar and a latter bar in the chart, wherein the gap time period is based on the composite metric of the earlier bar.

11. The computer readable storage medium of claim 10, further comprising computer readable program code causing the processor to perform:

determining an average completion time for ones of the plurality of phases common among the plurality of user stories.

12. The computer readable storage medium of claim 10, further comprising computer readable program code causing the processor to perform:

categorizing each bar of the chart as one of weak, average or strong based on the maximum completion time and the composite metric; and placing each bar of the chart at a location relative to the second axis based on the categorizing.

13. The computer readable storage medium of claim 10, further comprising computer readable program code causing the processor to perform:

displaying a user story chart for a selected user story of the plurality of user stories with the sprint time period as a first axis of the user story chart and labels for the plurality of phases for the selected user story as a second axis; and displaying a shape for each respective day of team member activity for each respective phase in the plurality of phases of the selected user story, wherein each shape is placed according to a corresponding day on the first axis and corresponding to a label on the second axis associated with the respective phase.

14. The computer readable storage medium of claim 10, further comprising computer readable program code causing the processor to perform:

displaying a number in each shape indicating a time of activity for the respective phase on the respective day; and displaying a number indicating actual time and a number indicating estimated time for each respective phase.

* * * * *